US008710426B2

(12) United States Patent
Makinouchi et al.

(10) Patent No.: US 8,710,426 B2
(45) Date of Patent: Apr. 29, 2014

(54) ENCODER THAT DETECTS POSITIONAL INFORMATION OF A MOVING BODY GENERATING INTERFERENCE FRINGES THAT MOVE IN OPPOSITE DIRECTIONS

(75) Inventors: Susumu Makinouchi, Zama (JP); Akihiro Watanabe, Sendai (JP); Toru Imai, Natori (JP)

(73) Assignee: Nikon Corporation, Tokyo (JP)

( * ) Notice: Subject to any disclaimer, the term of this patent is extended or adjusted under 35 U.S.C. 154(b) by 119 days.

(21) Appl. No.: 13/186,015

(22) Filed: Jul. 19, 2011

(65) Prior Publication Data

US 2011/0272565 A1 Nov. 10, 2011

Related U.S. Application Data

(63) Continuation of application No. PCT/JP2009/006008, filed on Nov. 11, 2009.

(30) Foreign Application Priority Data

Feb. 6, 2009 (JP) .................... 2009-026425

(51) Int. Cl.
*G01D 5/34* (2006.01)
(52) U.S. Cl.
USPC .................................. 250/231.16
(58) Field of Classification Search
USPC ............ 250/231.1, 231.16; 356/616
See application file for complete search history.

(56) References Cited

U.S. PATENT DOCUMENTS

| 6,639,686 | B1 | 10/2003 | Ohara |
| 2007/0057168 | A1 | 3/2007 | Imai |
| 2007/0267571 | A1 | 11/2007 | Makinouchi et al. |
| 2008/0185506 | A1* | 8/2008 | Makinouchi et al. ..... 250/231.13 |
| 2008/0258050 | A1 | 10/2008 | Makinouchi et al. |

FOREIGN PATENT DOCUMENTS

| EP | 1 970 673 A1 | 9/2008 |
| JP | 2006170899 A * | 6/2006 |
| JP | A-2006-170899 | 6/2006 |
| JP | A-2007-333722 | 12/2007 |
| WO | WO 2007/077855 A1 | 7/2007 |

OTHER PUBLICATIONS

Dec. 28, 2009 International Search Report issued in International Application No. PCT/JP2009/006008 (with English translation).
Dec. 28, 2009 Written Opinion issued in International Application No. PCT/JP2009/006008 (with English translation).
Mar. 5, 2013 Office Action issued in Japanese Patent Application No. 2010-549279 (with English Translation).
Office Action dated May 27, 2013 issued in Chinese Patent Application No. 200980155991.8 (with translation).

* cited by examiner

*Primary Examiner* — Thanh Luu
*Assistant Examiner* — Renee Naphas
(74) *Attorney, Agent, or Firm* — Oliff PLC

(57) ABSTRACT

An encoder includes: a light modulation section which modulates at least a portion of light that is emitted from a light source; a moving member which has an incidence plane, on which a plurality of light beams of the light incident, and is relatively movable in at least one direction; and at least two light receiving sections which respectively receive interference fringes that are generated in at least two regions on the moving member, wherein the light enters into the moving member such that at least two interference fringes move in opposite directions on the moving member in accordance with a modulation by the light modulation section.

11 Claims, 6 Drawing Sheets

ENCODER THAT DETECTS POSITIONAL INFORMATION OF A MOVING BODY GENERATING INTERFERENCE FRINGES THAT MOVE IN OPPOSITE DIRECTIONS

CROSS-REFERENCE TO RELATED APPLICATION

This is a Continuation Application of International Application No. PCT/JP2009/006008, filed Nov. 11, 2009, which claims priority to Japanese Patent Application No. 2009-026425 filed on Feb. 6, 2009, the contents of which are hereby incorporated by reference in their entirety.

BACKGROUND

1. Field of the Invention

The present invention mainly relates to an encoder and, more specifically, to an encoder which optically detects positional information of a moving body.

2. Description of Related Art

In recent years, as a scan-type encoder, an encoder has been proposed which moves along with a moving body, and positional information of a scale is detected by, irradiate the scale, which a grating is periodically formed along the movement direction, with irradiation light that is modulated on the basis of a given modulation signal, and then comparing the reflected light or the transmitted light with the modulation signal (U.S. Pat. No. 6,639,686).

Also, as the scan-type encoder, there is a technique which detects the information of the irradiation position of the first light on the moving body, on the basis of a second light which irradiates the first light to the moving body that is a scale for measurement and irradiated to a reference scale or a midpoint monitor that is different from the moving body (PCT International Publication No. WO 07/077,855).

SUMMARY

In such a scan-type encoder, there is a case where the wavelength center of light that is emitted from a light source drifts due to, for example, the influence of heat or the like which is generated from the light source, variation of a holding member which holds the light source, a moving body, or the like, variation over time of the light source, or the like.

In such a case, an error is included in the position detection result of the moving body, and there is a problem that a very large error is generated as a high-resolution sensor.

An aspect of the invention has an object to provide an encoder in which an error that is included in the position detection result of a moving body is reduced, so that the precision of the position detection result of the moving body is improved.

According to an embodiment of the invention, there is provided an encoder comprising: a light modulation section which modulates at least a portion of light that is emitted from a light source section; a moving member which has an incidence plane, on which a plurality of light beams of the light incident, and is relatively movable in at least one direction; and at least two light receiving sections which respectively receive interference fringes that are generated in at least two regions on the moving member, wherein the light enters into the moving member such that the at least two interference fringes move in opposite directions with each other on the moving member in accordance with modulation by the light modulation section.

According to another embodiment of the invention, there is provided an encoder comprising: a light modulation section which modulates at least a portion of light that is emitted from a light source section; a moving member which has at least two regions, into which a plurality of light beams of the light enters, and is movable in at least one direction; a light deflection member which deflects at least a first light beam among the plurality of light beams so as to enter the deflected light into one of the at least two regions, and deflects at least a second light beam among the plurality of light beams in a direction different from that of the first light beam so as to enter the deflected light into the other of the at least two regions; a first light receiving section which receives a first interfering light formed by interference of the first light beam and a third light beam which is among the plurality of light beams and enters into one of the at least two regions; and a second light receiving section which receives a second interfering light formed by interference of the second light beam and a fourth light beam which is among the plurality of light beams and enters into the other of the at least two regions.

According to still another embodiment of the invention, there is provided an encoder comprising: a light modulation section which modulates at least a portion of light that is emitted from a light source section; a moving member which is movable and has an incidence plane, on which a plurality of light beams from the light source section incident; and at least two light receiving sections which respectively detect interference fringes that are generated in at least two regions on the moving member, wherein the at least two interference fringes move in different directions with each other on the moving member in accordance with modulation by the light modulation section.

According to further still another embodiment of the invention, there is provided an encoder comprising: a light modulation section which modulates at least a portion of light that is emitted from a light source section; a moving member which is movable and includes an incidence plane having at least two regions, on which a plurality of light beams from the light source section incident; a light deflection member which deflects one of a first light beam and a third light beam, that enter into a first cross region in the incidence plane, and deflects one of a second light beam and a fourth light beam, that enter into a second cross region in the incidence plane; a first light receiving section which detects a first interfering light formed by the interference of the first light beam and the third light beam; and a second light receiving section which detects a second interfering light formed by the interference of the second light beam and the fourth light beam.

According to an aspect of the invention, it is possible to reduce an error in the position detection result of the moving grating, thereby improving the precision of the position detection result of the moving grating by the encoder.

DESCRIPTION OF EMBODIMENTS

First Embodiment

Figure 1:
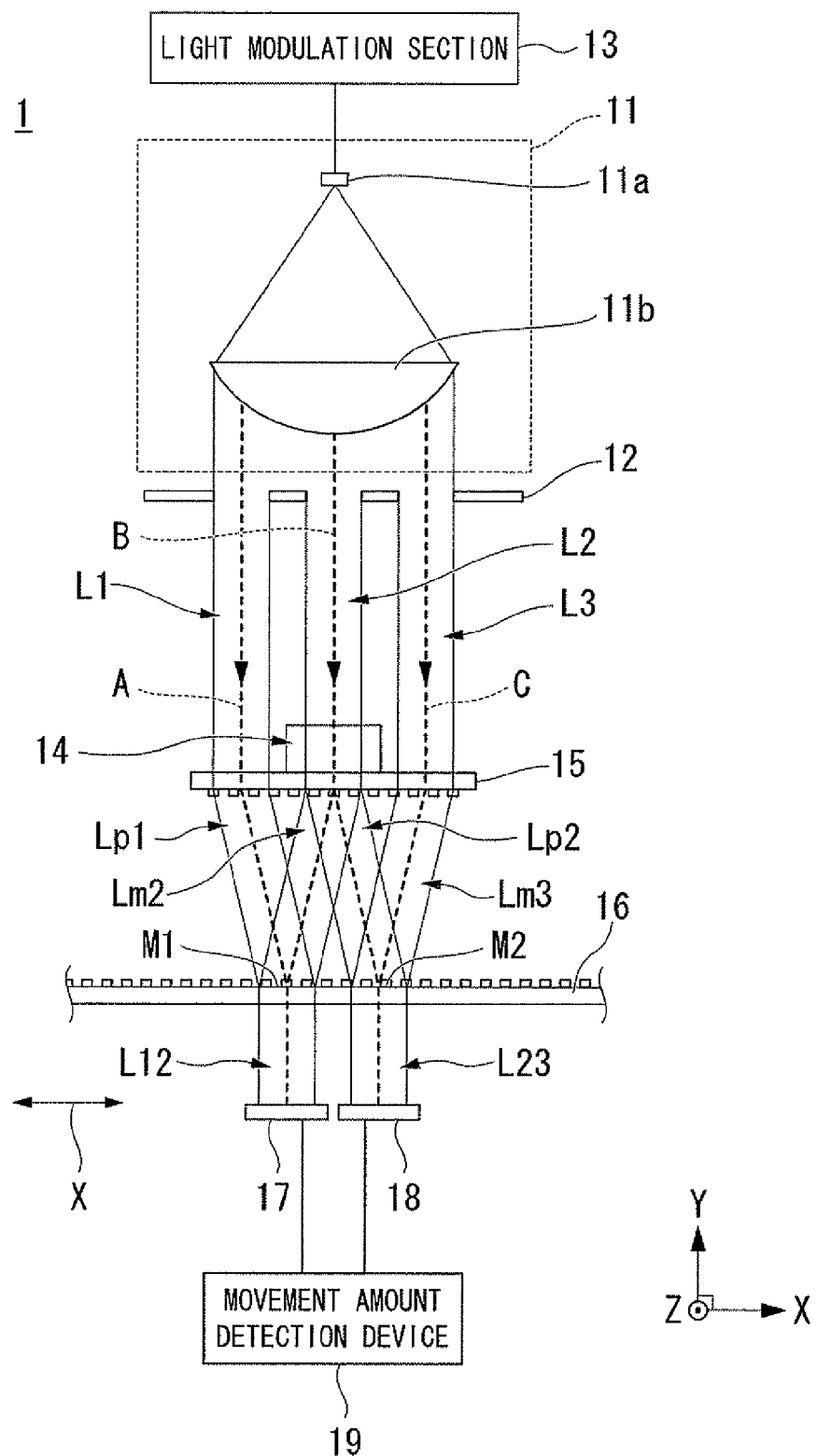
FIG. 1 is a schematic view illustrating a first embodiment.

Hereinafter, one embodiment of the invention will be described with reference to the drawings. FIG. 1 is a schematic view illustrating the configuration of an encoder 1 related to one embodiment of the invention. In this embodiment, the encoder 1 is an encoder of a so-called diffraction interference system and is an optical encoder which detects the movement direction, the movement amount, or the displacement of a moving body (a moving grating) which moves in a given direction (for example, the X-axis direction). In addition, hereinafter, a description is performed as a direction facing the upper side of a paper plane as the positive direction of a Y-axis, the right direction of the paper plane as the positive direction of an X-axis, and a direction facing the surface from the back side of the paper plane as the positive direction of a Z-axis.

As shown in FIG. 1, in this embodiment, the encoder 1 includes a light source section 11, a light branching member 12, a light modulation section 13, a glass block 14, an index grating 15, two light receiving elements 17 and 18, a movement amount detection device 19, and a moving grating 16 which is provided to be able to be displaced relatively with respect to these constituent members.

The light source section 11 includes a light source 11a and a collimator lens 11b. In addition, the light source section 11 may have a configuration in which it does not include the collimator lens 11b.

The light source 11a is, for example, a laser element which emits a laser light, and emits a coherent light toward the −Y-axis direction side, of which a wavelength of the coherent light is modulated by the light modulation section 13.

The collimator lens (collimating member) 11b receives the light emitted from the light source 11a and deflects the light to parallel light in the Y-axis direction.

The light branching member 12 receives the light emitted from the light source section 11 and divides the received light into a plurality of light beams L1, L2, and L3. That is, the light branching member 12 is composed of, for example, a mask having partially different transmissivity, which transmits the light at positions corresponding to optical paths A, B, and C and blocks the light at the other portions, and a light receiving surface thereof is disposed at a position (the X-axis direction) orthogonal to the optical axis (the Y-axis direction) of the parallel light emitted from the collimator lens 11b. Accordingly, the parallel light entered into the light branching member 12 is branched into the light beam L1 to L3 and emitted from the positions corresponding to the optical paths A, B, and C.

The light modulation section 13 periodically changes the wavelength of the light which is emitted from the light source 11a, by changing, for example, an electric current which is supplied to the light source 11a. The light modulation section 13 changes, for example, the wavelength, λ=850 nm, of the light which is emitted from the light source 11a by an amount corresponding to Δλ=±5 nm. That is, the light modulation section 13 changes the wavelength of the light which is emitted from the light source 11a, in the range of λ=845 nm to 855 nm.

The glass block 14 is an optical path change section that changes the optical path length of at least some light of the plurality of light beams emitted from the light source section 11 and is disposed, for example, in the optical path B between the light branching member 12 and the moving grating 16, thereby transmit the light beam L2 which is emitted from the light branching member 12. The glass block 14 has a predetermined refractive index N1 and a predetermined thickness D in the travelling direction (for example, the Y-axis direction) of the light beam L2 emitted from the light branching member 12.

Accordingly, the optical path length of the light beam L2 which penetrates the glass block 14 becomes longer compared to the optical path lengths of the light beams L1 and L3 which penetrate, for example, the air, in accordance with the magnitudes of the refractive index N (for example, the refractive index N1) and the thickness D thereof. That is, the glass block 14 is disposed only in the optical path B of the light beam L2 within the light beams L1 and L2, in which substantial distances as the optical paths from the light source 11a to the moving grating 16 are the same, thereby relatively changing the optical path lengths of the light beams L1 and L2, and making the optical path length of the light beam L2 longer compared to the optical path length of the light beam L1. Similarly, also in the light beams L2 and L3, the glass block 14 is disposed only in the optical path B of the light beam L2, whereby the optical path lengths of the light beams L2 and L3 are relatively changed by the glass block 14. In this way, the optical path length of the light beam L2 becomes longer compared to the optical path length of the light beam L3. That is, the optical path length of the light beam L2 from the light source 11a to the moving grating 16 is longer compared to the optical path lengths of the light beams L1 and L3 from the light source 11a to the moving grating 16. The glass block 14 can relatively change the optical path lengths between a plurality of light beams which enters into a cross region that is formed on the moving grating 16.

In this way, in the light beam L2 penetrating the glass block 14, even if the substantial distance as the optical path thereof is the same as those of the light beams L1 and L3, the phase of a wave front is late in the incidence plane of the moving grating 16. Here, the optical path length is an optical distance which is obtained by multiplying the spatial distance by the refractive index.

The index grating 15 is a light deflection member which changes each of the travelling directions of the plurality of light beams L1 to L3 emitted from the light branching member 12, so as to form at least two cross regions on the moving grating 16.

The index grating 15 is, for example, a diffraction grating, in which grating-shaped patterns are formed at a pitch that is substantially equal to that in the moving grating 16, and is a transmission-type diffraction grating having diffraction patterns periodically formed along the X-axis direction. The index grating 15 generates a plurality of diffracted lights on the basis of incident light and diffracts, for example, given incident light into ±first-order diffracted lights.

That is, the index grating 15 diffracts each of the incident light beams L1 to L3 into the ±first-order diffracted lights, thereby emitting a +first-order diffracted light Lp1 (a third light beam) based on the light beam L1, a −first-order diffracted light Lm2 (a first light beam) and a +first-order diffracted light Lp2 (a second light beam) based on the light beam L2, and a −first-order diffracted light Lm3 (a fourth light beam) based on the light beam L3. In addition, as described above, the optical path lengths (hereinafter each referred to as a first optical path length) from the light source section 11 to the moving grating 16 of the +first-order diffracted light Lp1 and the −first-order diffracted light Lm3 are the same as each other, and the optical path lengths (hereinafter each referred to as a second optical path length) from the light source section 11 to the moving grating 16 of the −first-order diffracted light Lm2 and the +first-order diffracted light Lp2 based on the light beam L2 are the same as each other, and the second optical path length is longer compared to the first optical path length. Also, as described above, the +first-order diffracted light Lp1 and the −first-order diffracted light Lm3 are composed of the same light and the −first-order diffracted light Lm2 and the +first-order diffracted light Lp2 based on the light beam L2 are composed of the same light.

The moving grating 16 is a diffraction grating provided at a moving body which is displaced relatively with respect to the light source section 11, the light branching member 12, the light modulation section 13, the glass block 14, the index grating 15, and the light receiving elements 17 and 18. Further, the moving grating 16 is a diffraction grating in which a diffraction pattern is periodically formed along the movement direction (for example, the X-axis direction) by the displacement.

The moving grating 16 has an incidence plane, on which a plurality of light beams of the light that is emitted from the light source section 11 incidents. Further, the moving grating 16 is located such that a plurality of cross regions M1 and M2 where the diffracted lights diffracted by the index grating 15 overlap each other are formed in the incidence plane, and emits the diffracted lights which were entered into the plurality of cross regions M1 and M2 from an emitting plane in such a manner that the travelling directions become substantially the same direction. That is, the +first-order diffracted light Lp1 and the −first-order diffracted light Lm2 entered into the cross region M1 on the moving grating 16, interfere with each other by partially overlapping, and are emitted to the −Y-axis direction side as an interfering light L12. Also, the +first-order diffracted light Lp2 and the −first-order diffracted light Lm3 entered into the cross region M2 on the moving grating 16, interfere with each other by partially overlapping, and are emitted as an interfering light L23 to the −Y-axis direction side that is substantially in the same direction as the interfering light L12. Here, the cross region means a region where each of a plurality of incident lights overlap each other in the incidence plane of the moving grating 16 and a region where an interference fringe is formed.

That is, the −first-order diffracted light Lm2 that enters into the cross region M1 on the moving grating 16 and the +first-order diffracted light Lp2 that enters into the cross region M2 on the moving grating 16, enter into the incidence plane of the moving grating 16 from opposite directions with each other with respect to the incidence plane direction of the moving grating 16. Here, the expression, "respectively enter from opposite directions with each other", means that, for example, the −first-order diffracted light Lm2 and the +first-order diffracted light Lp2, which enter into the different cross regions M1 and M2 on the moving grating 16, enter (for example, obliquely enter) into the incidence plane of the moving grating 16 from different directions with each other in an imaginary plane (for example, the X-Y plane) which is orthogonal to the incidence plane of the moving grating 16 and, in other words, means that the −first-order diffracted light Lm2 and the +first-order diffracted light Lp2 enter from the opposite directions with respect to an arbitrary imaginary line which is parallel to the optical axes (the Y-axis direction) of the plurality of light beams L1 to L3 that are orthogonal to the incidence plane of the moving grating 16, and having an incident angles in opposite directions (the +X-axis direction side and the −X-axis direction side) of the X-axis direction with respect to the imaginary line. In addition, the incident angles with respect to the moving grating 16 may be the same or may be different angles. Also, even if they are not strictly the same incident angle, they may be approximately the same angle in the range of design error.

Also, although it is not shown, the −first-order diffracted light Lm2 that enters into the cross region M1 on the moving grating 16 and the +first-order diffracted light Lp2 that enters into the cross region M2 on the moving grating 16 may intersect with a given axis from opposite sides with each other, wherein a given axis is perpendicular to the incidence plane of the moving grating 16, before the −first-order diffracted light Lm2 and the +first-order diffracted light Lp2 respectively enter into the moving grating 16. In this case, after the intersection of the −first-order diffracted light Lm2 with the +first-order diffracted light Lp2, the −first-order diffracted light Lm2 and the +first-order diffracted light Lp2 enter into different cross regions on the moving grating 16 from opposite directions with each other.

Further, among the light beams that enter into the moving grating 16, the −first-order diffracted light Lm2 that enters into the cross region M1 on the moving grating 16 and the +first-order diffracted light Lp2 that enters into the cross region M2 on the moving grating 16 are respectively symmetrical to a given axis which is perpendicular to the incidence plane of the moving grating 16. In addition, the given axis that becomes a symmetrical axis may be approximately perpendicular to the incidence plane of the moving grating 16 and includes the range of design error.

Also, the optical paths of the +first-order diffracted light Lp1 and the −first-order diffracted light Lm2 that enter into the cross region M1 of the moving grating 16 are, for example in the cross region M1, symmetrical to an approximately vertical straight line (the Y-axis direction, that is, the optical axis of the light that is emitted from the light source section 11) which is approximately orthogonal to the movement direction (the X-axis direction) of the moving grating 16 and an incident angles that enter into the moving grating 16 become the same angle. Similarly, the +first-order diffracted light Lp2 and the −first-order diffracted light Lm3 that enter into the cross region M2 of the moving grating 16 are, for example in the cross region M2, also symmetrical to the Y-axis direction and an incident angles that enter into the moving grating 16 become the same angle. In addition, the approximately vertical straight line includes the range of design error.

In this embodiment, the moving grating 16 is, for example, a transmission-type diffraction grating and emits the interfering lights L12 and L23 toward the plurality of light receiving elements 17 and 18 which is disposed at the emitting surface side of the moving grating 16. In other words, the interfering light L12 based on the +first-order diffracted light Lp1 and the −first-order diffracted light Lm2 enters into the light receiving element 17 (a first light receiving section) and the interfering light L23 based on the +first-order diffracted light Lp2 and the −first-order diffracted light Lm3 enters into the light receiving element 18 (a second light receiving section).

The light receiving elements 17 and 18 respectively receive the interfering lights L12 and L23 emitted from different positions of the moving grating 16 and output a photoelectric conversion signals which represent the interference intensities of the interfering lights L12 and L23.

The movement amount detection device 19 is connected to each of the light receiving elements 17 and 18 and the photoelectric conversion signals converted in the light receiving elements 17 and 18 are input thereto. The movement amount detection device 19 calculates movement information (positional information) of the moving grating 16 on the basis of the photoelectric conversion signals detected by the light receiving elements 17 and 18.

In addition, the moving grating 16 is not limited to the transmission-type diffraction grating, but may be, for example, a reflection-type diffraction grating, and in this case, the light receiving elements 17 and 18 are disposed at a positions (for example, the incidence plane side of the moving grating 16) where they can receive the reflected light.

Next, one example of an interfering light detection method by the encoder 1 will be described.

The modulated light in which the wavelength of the light is modulated by the light modulation section 13 is emitted to the −Y-axis direction side from the light source 11a. The modulated light emitted from the light source 11a penetrates the collimator lens 11b, and thereby being deflected into parallel light. The parallel light deflected by the collimator lens 11b enters into the light branching member 12 and is divided into the plurality of light beams L1 to L3. The light beams L1 to L3 emitted from the light branching member 12 and travelling in the optical paths A and B travel in a direction (the Y-axis direction) parallel to the optical axis of the parallel light deflected by the collimator lens 11b and then enter into the index grating 15.

Among the plurality of light beams L1 to L3, the light beams L1 and L3 directly enter into the index grating 15 and are respectively diffracted into the light beam Lp1 or the light beam Lm3 by the index grating 15. On the other hand, the light beam L2 penetrates the glass block 14 and then enters into the index grating 15, thereby being diffracted into the light beam Lm2 and the light beam Lp2.

The light beams Lp1 and Lm2 diffracted by the index grating 15 enter into the cross region M1 on the incidence plane of the moving grating 16, are further diffracted by the moving grating 16, and are then emitted to the −Y-axis direction side as the interfering light L12. Similarly, the light beams Lp2 and the light beam Lm3 enter into the cross region M2 on the incidence plane of the moving grating 16, are further diffracted by the moving grating 16, and are then emitted to the −Y-axis direction side as the interfering light L23. In the cross region M1 of the moving grating 16, an interference fringe that periodically changes in a first direction is formed, and in the cross region M2 of the moving grating 16, an interference fringe that periodically changes in a second direction which is different from the first direction is formed.

The interfering lights L12 and L23 emitted from the moving grating 16 respectively enter into the light receiving elements 17 and 18 and are converted into photoelectric conversion signals which represents the interference intensities of the interfering lights.

In this manner, (1) the light beams L1 to L3 that are emitted from the light source section 11 have the modulated wavelengths, and among the light beams based on the interfering lights L12 and L23 that are emitted from the moving grating 16, the light beam Lm2 and the light beam Lp2 are a light beams based on the same light beam L2 in which a same optical path length differential are made with respect to the light beams L1 and L3 based on the same light beam. Further, (2) the light beams Lm2 and Lp2 emitted from the index grating 15 are respectively emitted to the opposite direction sides with respect to the movement direction (the X-axis direction) of the moving grating 16. Further, an optical system (the light branching member 12, the glass block 14, and the index grating 15) from the light source section 11 to the moving grating 16 is symmetrical to the optical axis (the Y-axis direction) of the light beam L2 which is orthogonal to the incidence plane direction of the moving grating 16 and the optical paths of the light beams L1 to L3 are symmetrical to the optical axis (a given axis) of the light beam L2 or an axis (a given axis) parallel to the optical axis.

In this way, (3) the interfering light L12 (a first interfering light) formed by the interference of the +first-order diffracted light Lp1 and the −first-order diffracted light Lm2, that enter into the cross region M1 on the moving grating 16, and the interfering light L23 (a second interfering light) formed by the interference of the +first-order diffracted light Lp2 and the −first-order diffracted light Lm3, that enter into the cross region M2 on the moving grating 16, have mutually opposite phases. Also, the interference intensities respectively based on the interfering lights L12 and L23 that are detected by the light receiving elements 17 and 18, are expressed by numerical expressions in which numerical items in regard to the modulation made by the light modulation section 13 have a mutually opposite phases. Accordingly, by adding the interference intensities respectively based on the interfering lights L12 and L23 that are detected by the light receiving elements 17 and 18, the numerical items in regard to the modulation can cancel each other out.

In addition, the interfering lights L12 and L23 having mutually opposite phases, as referred to herein, includes that, for example, the numerical items, in regard to the modulation which represent a phase differences, have mutually opposite phases, by the light beams on the other side, in which the same optical path length differential is made with respect to the light beams on one side, which is among a plurality of light beams that forms each interfering light within a plurality of interfering lights that are emitted from the moving grating 16, enter into the moving grating 16 toward the opposite direction sides from a straight line (the Y-axis direction) which is orthogonal to the movement direction (the X-axis direction) of the moving grating 16.

Further, in other words, including that the numerical items, in regard to the modulation which represent a phase differences, have mutually opposite phases, by the light beams on the other side, in which the same optical path length differential is made with respect to the light beams on one side, which is among a plurality of light beams that forms each interfering light in the respective cross regions M1 and M2, enter into the incidence plane of the moving grating 16 at the same incident angle, and enter into the opposite direction sides with respect to the movement direction of the moving grating 16.

Also, the light beams Lp1 and Lm2 and the light beams Lp2 and Lm3, that are based on the modulated light emitted from the light source 11a, respectively have a predetermined phase difference in a state where they have interfered with each other in the moving grating 16, whereby the encoder 1 can obtain an interference fringe that periodically changes (or moves), for example, in the movement direction (the X-axis direction), on the moving grating 16. In addition, a periodic change of the interference fringe is based on a periodic change of the wavelength modulated by the light modulation section 13, and the photoelectric conversion signals that are obtained by the light receiving elements 17 and 18 are represented by the positional information of the moving grating 16 modulated by a modulation signal that is imparted to the light modulation section 13. Therefore, the photoelectric conversion signals that are obtained by the light receiving elements 17 and 18 are based on both the positional information of the moving grating 16 and a periodic change of the modulated light that is emitted from the light source 11a, and on the basis of the photoelectric conversion signal, the positional information of the moving grating 16 can be obtained by using the known modulation information of the light modulation section 13.

Accordingly, (4) since the interference fringes in the cross region M1 (a first region) and the cross region M2 (a second region) on the moving grating 16 periodically change and the interfering lights L12 and L23 have mutually opposite phases, as described above, the interference fringe of the cross region M1 periodically changes in the first direction (for example, the −X-axis direction) and the interference fringe of the cross region M2 periodically changes in the second direction (for example, the +X-axis direction) different from the first direction. That is, the interference fringes, which are formed in each of at least two cross regions M1 and M2 on the moving grating 16, move in opposite directions with each other in accordance with modulation of the light modulation section 13.

In addition, each member related to this embodiment has the configuration as described above, whereby it is not limited to the above-mentioned expression, but can be expressed in other words as follows.

For example, the light modulation section 13 has a configuration in which it modulates at least a portion of the light that is emitted from the light source section 11, and modulates, for example, the wavelength or phase of the light. The light modulation section 13 related to this embodiment can relatively modulate the wavelengths of the light beams Lp1 and Lm2 that enter into the cross region M1 and relatively modulate the wavelengths of the light beams Lp2 and Lm3 that enter into the cross region M2.

Figure 2:
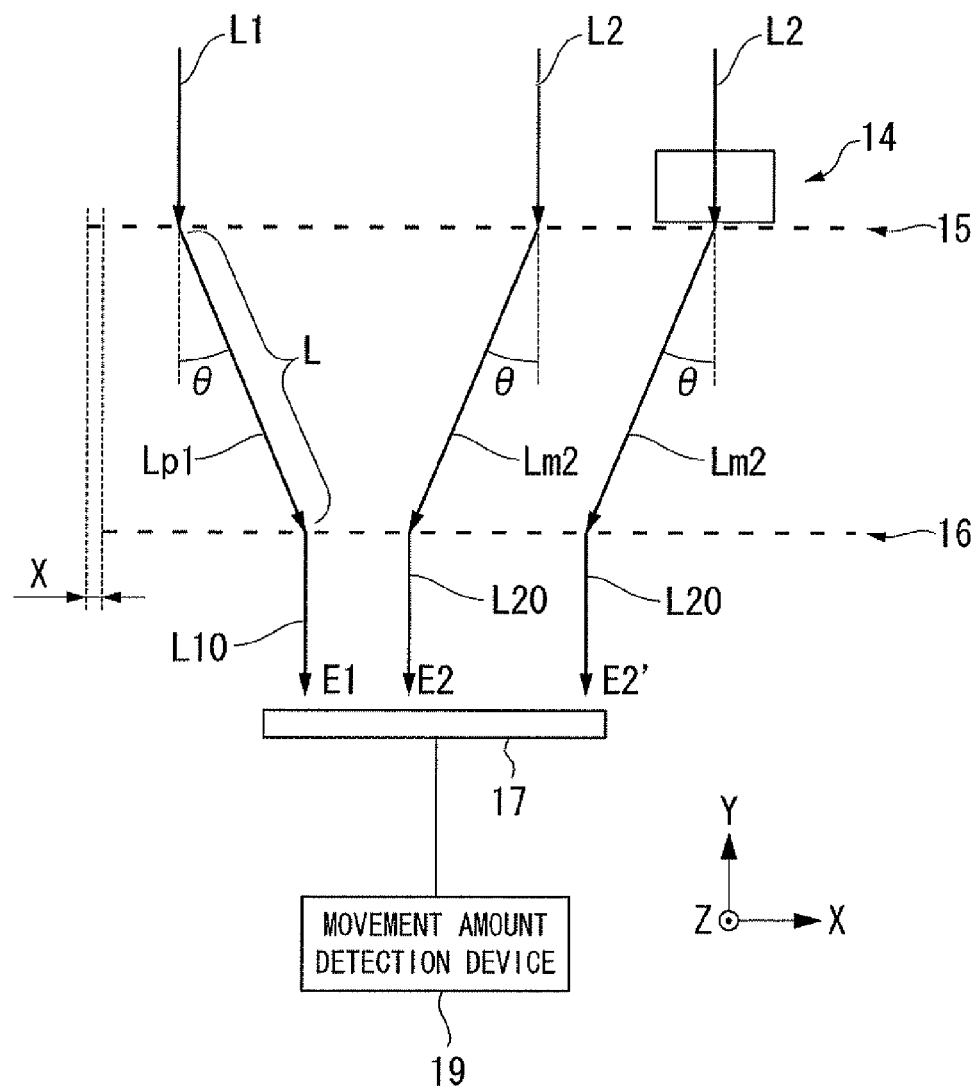
FIG. 2 is a schematic view describing interference in a moving grating in the embodiment.

Next, the interfering light L12 that is emitted from the moving grating 16 will be described in detail by using FIG. 2. FIG. 2 is a schematic view for describing a complex phase of the light beam in the encoder 1 shown in FIG. 1. In addition, for the convenience of explanation, in FIG. 2, the light beams Lp1 and Lm2 that interfere with each other in the cross region M1 of the moving grating 16 are described as been shifted to the X-axis direction, and the cases where the light beam Lm2 penetrates the glass block 14 and the cases where the light beam does not penetrate the glass block 14 are shown separately.

As shown in FIG. 2, the index grating 15 and the moving grating 16 are transmission-type diffraction gratings having the diffraction patterns of the same grating pitch which is periodically formed along the X-axis direction, and the index grating 15 diffracts the incident light beam L1 into +first-order diffracted light and the incident light beam L2 into −first-order diffracted light.

The +first-order diffracted light Lp1 diffracted from the light beam L1 by the index grating 15 is further diffracted into the −first-order diffracted light L10 by the moving grating 16 and then enters into the light receiving element 17. The complex phase of the −first-order diffracted light L10 is expressed in a manner such as in Expression 1. In the Expression 1, "k" represents a wavelength, "L" represents a light beam distance between the index grating 15 and the moving grating 16, as shown in FIG. 2, "P" represents a grating pitch of each of the index grating 15 and the moving grating 16, and "X" represents relative positional information in the X-axis direction between the gratings of the index grating 15 and the moving grating 16.

$$E1 = A \cdot \exp(jKL + 2\pi/P \cdot (L \sin \theta + X)) \quad \text{(Expression 1)}$$

Also, similarly, the −first-order diffracted light Lm2 diffracted from the light beam L2 by the index grating 15 is further diffracted into the +first-order diffracted light L20 by the moving grating 16 and then emitted to the light receiving element 17. The complex phase of the +first-order diffracted light L20 is expressed in a manner such as in Expression 2.

$$E2 = A \cdot \exp(jKL + 2\pi/P \cdot (L \sin \theta - X)) \quad \text{(Expression 2)}$$

Then, interference intensity S1 in a case where the −first-order diffracted light L10 and the +first-order diffracted light L20 have interfered with each other is expressed in a manner such as in Expression 3.

$$S1 = |E1 \cdot E2|^2 = 2A^2 + 2\cos(4\pi X/P) \quad \text{(Expression 3)}$$

Therefore, in a case where any one of the index grating 15 or the moving grating 16 moves by one pitch in the movement direction (the X-axis direction), it is detected as a two-period ($4\pi$) light quantity change by the movement amount detection device 19 on the basis of the photoelectric conversion signal of the light receiving element 17.

On the other hand, such as the light beam L2 which is related to this embodiment, the complex phase of the +first-order diffracted light L20 which has an optical path length differential with respect to the light beam L1, because of the penetration of the glass block 14 by the light beam L2 before the light beam L2 enters into the index grating, is expressed in a manner such as in Expression 4.

$$E2' = A \cdot \exp(jKL + 2\pi/P \cdot (L \sin \theta - X) + \Delta L) \quad \text{(Expression 4)}$$

Here, comparing the Expression 2 with the Expression 4, the complex phase E'2 is different from the complex phase E2 by a phase difference $\Delta L$, and interference intensity S'1 in a case where the −first-order diffracted light L10 and the +first-order diffracted light L20 which has penetrated the glass block 14 are interfering with each other is expressed in a manner such as in Expression 5.

$$S'1 = |E1 \cdot E2'|^2 = 2A^2 + 2\cos(4\pi X/P + \Delta L) \quad \text{(Expression 5)}$$

That is, as can be seen from Expressions 3 and 5, the interference intensity of an interfering light that includes the +first-order diffracted light L20 which penetrates the glass block 14 is also different by the phase difference $\Delta L$. In addition, as shown in Expressions 3 and 5, since the interference intensities that are obtained by the light receiving elements 17 and 18 do not include a variable term depending upon a wavelength, even if a wavelength is changed, the pattern of the interference intensity does not change.

Here, the phase difference $\Delta L$ is expressed by an expression, $\Delta L = (N-1) \cdot D \cdot \Delta k$, and in a case where the wavelength of light has been modulated from $\lambda_1$ to $\lambda_2$ by the light modulation section 13, if $\Delta k$ is set to be equal to $(1/\lambda_1 - 1/\lambda_2)$, since the wavelength is modulated in such a manner as an expression, $\Delta \lambda = \lambda_0 \cdot \sin \omega t$, the relationships of $\Delta k = A_0 \cdot \sin \omega t$ and $\Delta L = (N-1) \cdot D \cdot A_0 \cdot \sin \omega t$ are obtained. Substituting the phase difference, $\Delta L = (N-1) \cdot D \cdot A_0 \cdot \sin \omega t$, into Expression 5, it is expressed in such a manner as Expression 6. Here, "N" represents the refractive index of the glass block 14, "D" represents the thickness of the glass block 14, "$A_0$" represents a given setting value that is determined at the time of design, and "$\omega t$" represents an angle phase.

$$S'1 = |E1 \cdot E2'|^2 = 2A^2 + 2\cos(4\pi X/P + (N-1)DA0 \cdot \sin \omega t) \quad \text{(Expression 6)}$$

That is, as shown in Expression 6, the interference intensity of the interfering light L12 which is formed by the interference of the light beam Lp1 and the light beam Lm2 that is detected by the light receiving element 17, is positional information X of the moving grating 16 that has been modulated by a modulation signal that is imparted to the light modulation section 13. In addition, in a case where the photoelectric conversion signal of the interference intensity that is expressed by Expression 6 is output to the movement amount detection device 19 (a position calculation section), the positional information X of the moving grating 16 is calculated by the movement amount detection device 19.

Similarly, the interference intensity S2 of the interfering light L23 is expressed in a manner such as in Expression 7.

$$S2=|E3 \cdot E4'|^2=2A^2+2\cos(4\pi X/P-(N-1)DA_0 \cdot \sin \omega t) \quad \text{(Expression 7)}$$

In this manner, the interference intensity S'1 of the interfering light L12, that is shown in Expression 6, and the interference intensity S2 of the interfering light L23, that is shown in Expression 7, have mutually opposite phases. Accordingly, by adding these and dividing by 2, that is, by calculating an expression, (S'1+S2)/2, a modulation element that is modulated by the light modulation section 13 is eliminated, and the positional information X of the moving grating 16 which does not include the modulation element, can be calculated at the movement amount detection device 19.

Therefore, for example, even in a case where the wavelength center of the light from the light source section 11 drifts, in the positional information X of the moving grating 16 that is calculated by the movement amount detection device 19, an error of the position detection result of the moving grating 16 that is generated by the wavelength center of the light being out of alignment or the like is not included, such that it is possible to improve the precision of the position detection result of the moving grating 16 by the encoder 1.

Also, since it is not necessary to provide a compensation mechanism or the like for detecting an error that is included in the position detection result of the moving grating 16, the configuration of the encoder 1 is simplified and it is possible to reduce the cost for providing the compensation mechanism or the like.

In addition, in this embodiment, a description has been performed using an example where the glass block 14 is disposed in any one of the optical paths that constitute the interfering lights L12 and L23. However, the invention is not limited thereto and for example, a configuration is also acceptable in which subject to a relative impartation of an optical path length differential in the light beams which constitute the interfering light, the glass block 14 is disposed in the optical paths of both the light beams constituting the interfering light.

Further, in this embodiment, as for the light branching member 12, an example where it divides the light from the light source section 11 into three light beams L1 to L3 has been described. However, the invention is not limited thereto and a configuration is also acceptable in which the light branching member 12 divides the light into four or more of light beams. For example, in the case of generating two interfering lights by making two light beams interfere with each other on the basis of the light beams divided into four by the light branching member 12, a configuration is also acceptable in which the glass blocks 14 are respectively disposed in the optical paths of the two light beams on either side, which constitute the interfering lights.

Further, in the encoder 1, even in a case where the wavelength variable range of the modulated light that is emitted from the light source section 11 is small, if the optical path difference ΔL is made sufficiently large compared to the wavelength variable range, it is possible to impart a change according to a periodic change of the modulated light that is emitted from the light source section 11, to the interference fringe that is formed on the moving grating 16. For example, in a case where a light-emitting laser diode is used as the light source 11a, if the central wavelength of the modulated light that is emitted from the light source section 11 is set to be 850 nm and a driving electric current that is supplied to the light-emitting laser diode is changed to be in the range of 2±0.5 mA, the wavelength of the light that is emitted from the light source section 11 changes in the range (wavelength variable range) of 850±1 nm. At this time, in a case where the glass block 14, in which the optical path difference ΔL is made to be 1 mm, has been used, since the optical path difference ΔL is sufficiently large compared to the wavelength variable range, the interference fringes that are formed on the moving grating 16 periodically change, such that the light receiving elements 17 and 18 can obtain photoelectric conversion signals.

Further, the modulation method of the modulated light that is emitted from the light source 11a, a modulation method which uses a change of an electric current by the above-mentioned light modulation section 13, for example, can use various variable wavelength lasers which are used for a purpose such as optical communication and the like. Further, the modulation method of the modulated light that is emitted from the light source 11a is not limited to the modulation method based on a change of the electric current and, for example, it is possible to use a device which periodically changes a wavelength by changing the temperature of a laser element that is used as the light source 11a.

Further, as for the glass block 14, it is acceptable if it is a medium that transmits light and has a predetermined refractive index N different from that of the surrounding area and, for example, a transparent medium such as crystal is also acceptable.

Further, in this embodiment, the ±first-order diffracted lights diffracted by the index grating 15 have been described as an example of the interfering light. However, a zero-order diffracted light is also acceptable and other orders of diffracted lights are also acceptable.

Further, although a description is performed using an example where two cross regions M1 and M2 are formed on the moving grating 16 related to this embodiment, the invention is not limited thereto and at least two or more cross regions M1 and M2 (interference fringes) may be formed.

Second Embodiment

Figure 3:
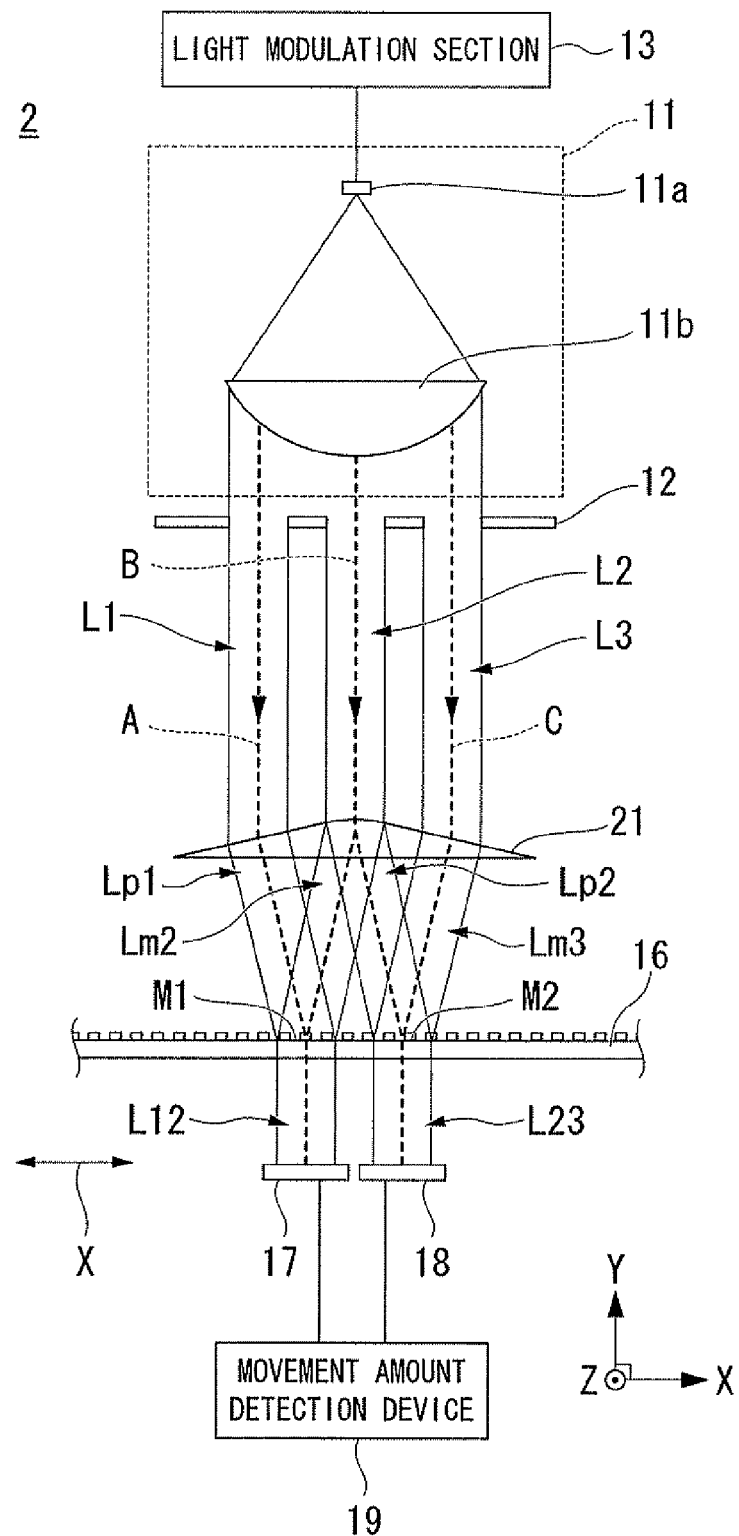
FIG. 3 is a schematic view illustrating a second embodiment.

Next, another embodiment related to the invention will be described with reference to FIG. 3. FIG. 3 is a schematic view of an encoder 2 related to a second embodiment. In addition, with regard to a constituent member having the same or equivalent function and configuration as that in the first embodiment, a detailed description is omitted and the same reference numerals are used.

As shown in FIG. 3, the encoder 2 includes the light source section 11, the light branching member 12, the light modulation section 13, a prism member 21, the two light receiving elements 17 and 18, the movement amount detection device 19, and the moving grating 16 which is provided to be able to be displaced relatively with respect to these constituent members. In this embodiment, the prism member 21 constitutes the optical path length change section and the light deflection member.

The prism member 21 serves as the optical path length change section, thereby relatively changing optical path lengths between a plurality of light beams which enters into the cross regions which are formed on the moving grating 16, and also serves as the light deflection member, thereby changing each of the travelling directions of the plurality of light beams L1 to L3 emitted from the light branching member 12, so as to form at least two cross regions on the moving grating 16.

The prism member 21 has, for example, a shape in which the thickness of the central portion is the thickest on the X-Y plane and the thickness becomes thinner as it goes toward both ends, as shown in FIG. 3, and has a predetermined thickness in the Z-axis direction. Also, the prism member 21 is formed of a material (for example, a transparent medium such as glass or crystal) having a refractive index different from that of the surrounding space. By this configuration, the prism member 21 changes the optical path lengths by relatively changing the indexes of refraction of the light beams penetrating regions having different thicknesses, and also changes the travelling directions of the light beams and divides the incident light into a plurality of light beams.

That is, the prism member 21 makes the optical path length of the light beam L2 penetrating the central portion long compared to the light beams L1 and L3 penetrating the end portions and also divides the light beam L2 into two light beams and emits the two divided light beams Lm2 and Lp2 to the moving grating 16 toward the opposite direction sides with each other from a straight line (the Y-axis direction) which is orthogonal to the movement direction (the X-axis direction) of the moving grating 16. The prism member 21 emits the light beam Lm2 formed by refracting the incident light beam L2 in the −X-axis direction, toward the cross region M1 on the moving grating 16 and emits the light beam. Lp2 formed by refracting the incident light beam L2 in the +X-axis direction, toward the cross region M2 on the moving grating 16. Also, the prism member 21 emits the light beam Lp1 formed by refracting the incident light beam L1 in the +X-axis direction, toward the cross region M1 on the moving grating 16 and emits the light beam Lm3 formed by refracting the incident light beam L3 in the −X-axis direction, toward the cross region M2 on the moving grating 16.

In this way, the light beams Lp1 and Lm2 emitted from the prism member 21 interfere with each other in the cross region M1 and is emitted as the interfering light L12 from the moving grating 16. Similarly, the light beams Lp2 and Lm3 emitted from the prism member 21 interfere with each other in the cross region M2 and is emitted as the interfering light L23 from the moving grating 16.

By this configuration, the interference intensities S'1 and S2 as shown in Expressions 6 and 7 are respectively obtained in the light receiving elements 17 and 18. Therefore, by adding both the interference intensities, the modulation element which is modulated by the light modulation section 13 is eliminated. Accordingly, since an error that is generated due to drifting of the wavelength center of the light or the like is not included in the positional information X of the moving grating 16 that is calculated by the movement amount detection device 19, the encoder 1 can improve the precision of the position detection result of the moving grating 16.

Also, the prism member 21 related to this embodiment serves as the optical path length change section, thereby being capable of changing the optical path lengths of the light beams Lp1 and Lm2 that enter into one cross region M1 and the optical path lengths of the light beams Lp2 and Lm3 that enter into the other cross region M2 and also changing all of the optical path lengths in such a manner that the optical path lengths of the light beams Lp1 and Lm3 and the optical path lengths of the light beams Lp2 and Lm3 become different optical path lengths.

Third Embodiment

Figure 4:
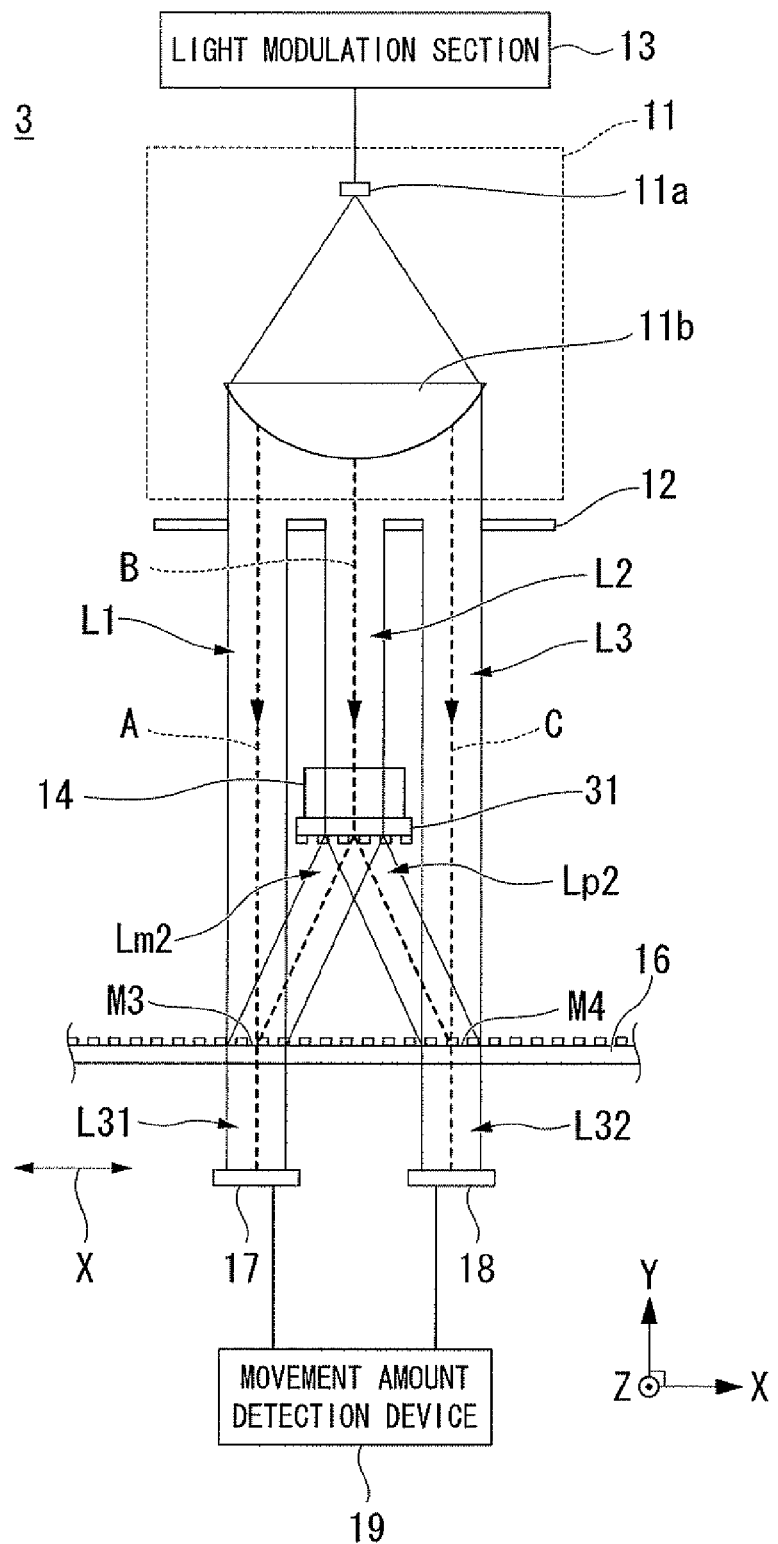
FIG. 4 is a schematic view illustrating a third embodiment.

Next, another embodiment related to the invention will be described with reference to FIG. 4. FIG. 4 is a schematic view of an encoder 3 related to a third embodiment. In addition, with regard to a constituent member having the same or equivalent function and configuration as that in the first embodiment, a detailed description is omitted and the same reference numerals are used.

As shown in FIG. 4, the encoder 3 includes the light source section 11, the light branching member 12, the light modulation section 13, the glass block 14, an index grating 31, the two light receiving elements 17 and 18, the movement amount detection device 19, and the moving grating 16 which is provided to be able to be displaced relatively with respect to these constituent members.

The index grating 31 is a diffraction grating having diffraction patterns of the same grating pitch as that of the moving grating 16, similarly to the index grating 15 related to the first embodiment. However, the index grating 31 is different from the index grating 15 in that the index grating 31 is disposed in the optical path of the light beam L2 and not disposed in the optical paths of the light beams L1 and L3. That is, the index grating 31 is a light deflection member which deflects at least some (for example, the light beam L2) among a plurality of light beams which is emitted from the light source section 11.

In this way, similarly to the first and second embodiments described above, the light beams Lm2 and Lp2 in which an optical path length difference is relatively imparted by the glass block 14 and which are diffracted toward the opposite direction sides with each other from the straight line (the Y-axis direction) which is orthogonal to the movement direction (the X-axis direction) of the moving grating 16 by the index grating 31 are respectively emitted to cross regions M3 and M4.

On the other hand, the light beams L1 and L3 directly enter into the cross regions M3 and M4, whereby the light beam L1 interferes with the light beam Lm2 and is emitted to the light receiving element 17 as an interfering light L31, and the light beam L3 interferes with the light beam Lp2 and is emitted to the light receiving element 18 as an interfering light L32.

By this configuration, since the interference intensities S'1 and S2 as shown in Expressions 6 and 7 are respectively obtained in the light receiving elements 17 and 18, the modulation element which is modulated by the light modulation section 13 is eliminated by adding both the interference intensities.

In this manner, the encoder may have a configuration that uses an interfering light which is formed by the light that is not a diffracted light and a diffracted light, and may have a configuration that uses an interfering light which is formed by the lights that both are not diffracted lights.

Also, in this embodiment, in a case where a phase difference (or an optical path length difference) of the light beam L2 can be sufficiently secured with respect to another light beam, the glass block 14 may be absent.

Fourth Embodiment

Figure 5:
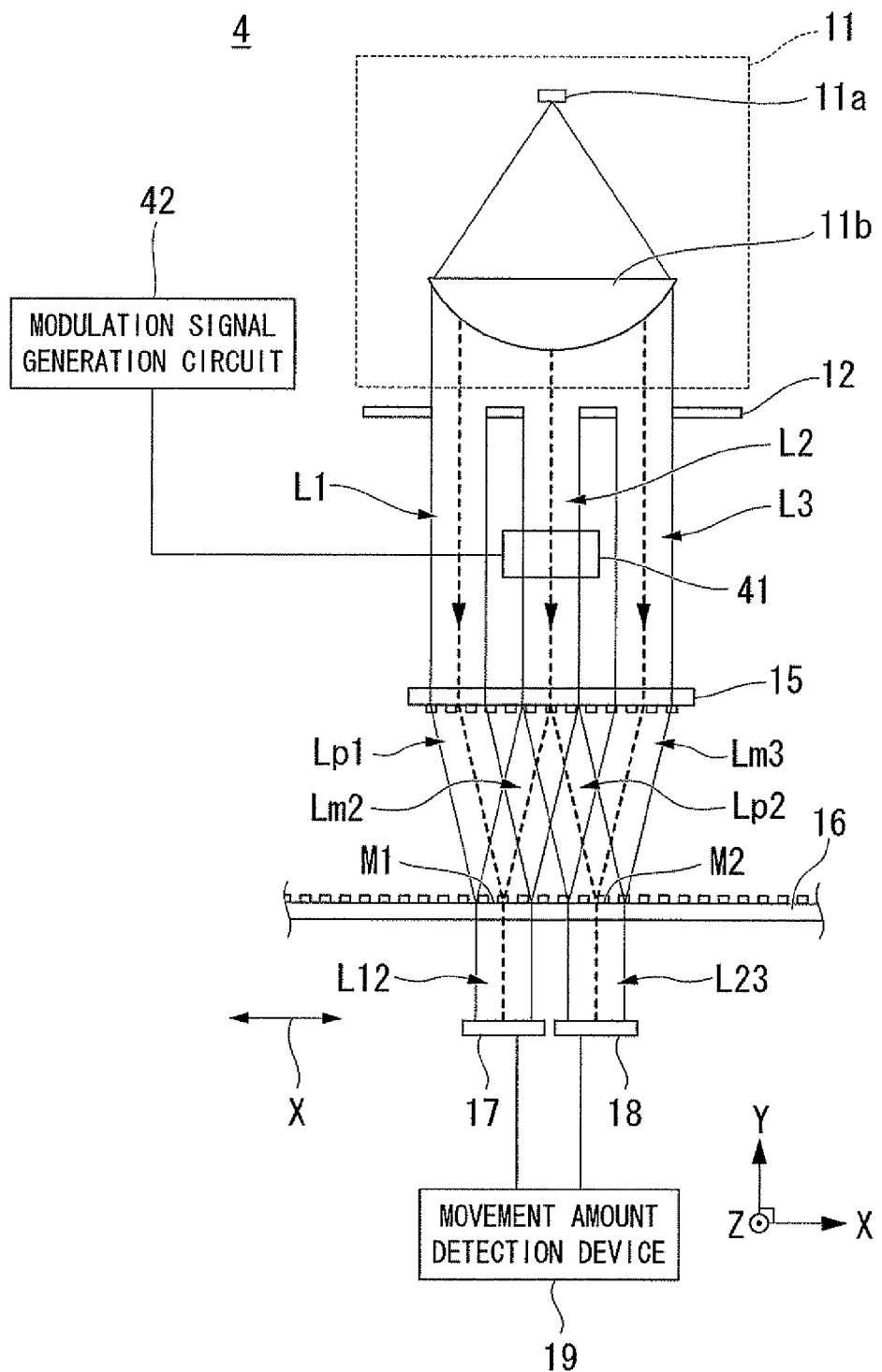
FIG. 5 is a schematic view illustrating a fourth embodiment.

Next, another embodiment related to the invention will be described with reference to FIG. 5. FIG. 5 is a schematic view of an encoder 4 related to a fourth embodiment. In addition, with regard to a constituent member having the same or equivalent function and configuration as that in the first embodiment, a detailed description is omitted and the same reference numerals are used.

As shown in FIG. 5, the encoder 4 includes the light source section 11, the light branching member 12, the index grating 15, an electro-optical element 41, a modulation signal generation circuit 42, the two light receiving elements 17 and 18, the movement amount detection device 19, and the moving grating 16 which is provided to be able to be displaced relatively with respect to these constituent members. In this embodiment, the electro-optical element 41 and the modulation signal generation circuit 42 constitute the light modulation section 13 and the index grating 15 constitutes the light deflection member.

The electro-optical element 41 is composed of an optical modulation element such as an EOM (Electro-Optic Modulator), for example, and disposed only in the optical path of the light beam L2 between the light branching member 12 and the index grating 15.

The modulation signal generation circuit 42 generates a modulation signal which modulates the light beam L2 that penetrates the electro-optical element 41, and outputs the modulation signal to the electro-optical element 41. The modulation signal generation circuit 42 outputs a modulation signal that shifts the phase of the light incident on the electro-optical element 41 by, for example, the phase difference ΔL.

That is, the electro-optical element 41 and the modulation signal generation circuit 42 serve as a light modulation section which modulates at least a portion (for example, the light beam L2) of the light that is emitted from the light source section 11, relatively modulate the phases of the Light beams Lp1 and Lm2 that enter into the cross region M1, and relatively modulate the phases of the Light beams Lp2 and Lm3 that enter into the cross region M2.

By this configuration, the electro-optical element 41 modulates the incident light beam L2 by modulating the phase on the basis of the modulation signal input from the modulation signal generation circuit 42. That is, the phase of the light beam L2 is relatively modulated with respect to the light beams L1 and L3. Accordingly, in the encoder 3, (1) a phase difference is relatively imparted in the relationship between the light beams Lp1 and Lm2 and the relationship between the light beams Lp2 and Lm3 among a plurality of light beams that forms the interfering lights, whereby the light beams that enter into the cross regions M1 and M2 are modulated, (2) the light beams Lm2 and Lp2 on one side, that constitute each interfering light, enter into the moving grating 16 toward opposite directions with each other with respect to the movement direction of the moving grating 16, (3) whereby in the interference intensities of the interfering lights L12 and L23 that are emitted from the cross regions M1 and M2, the numerical items relating to modulation, that represent the phase difference, become mutually opposite phases, and (4) the interference fringes in the cross regions M1 and M2 on the moving grating 16 periodically change in different directions with each other.

In this way, since the interference intensities S'1 and S2 as shown in Expressions 6 and 7 are respectively obtained in the light receiving elements 17 and 18, the modulation element which is modulated by the light modulation section 13 is eliminated by adding the two interference intensities together.

In this manner, for example, if the phase of the light beam Lm2 that is at least any one of the lights constituting the interfering light L12 in the cross region M1 of the moving grating 16 is modulated, the interference fringe of the cross region M1 periodically changes.

In addition, in this embodiment, a description has been performed using an example where modulation is carried out by using the electro-optical element 41 that is composed of the EOM. However, the invention is not limited to this embodiment and, for example, an acousto-optical element that is composed of an AOM (Acousto-Optic Modulator) or the like may be used in place of the electro-optical element or along with the electro-optical element.

Fifth Embodiment

In the invention, as described previously, the wavelength of the light that is emitted from the light source is periodically modulated. Therefore in a case where an electric current that is supplied to the light source is modulated, modulation of the amount of light is also involved in addition to the modulation of the wavelength. Since the degree of modulation of the wavelength is small, the modulation of the amount of light is small. However, the need to eliminate the modulation of the amount of light can also be considered. Hereinafter, an embodiment for eliminating the modulation of the amount of light will be described with reference to FIG. 6. The configuration which is described below can be applied to the encoders of all of the above-described embodiments. In addition, an encoder 5 of this embodiment is described using an example where it is applied to the encoder 1 related to the first embodiment. Therefore, with regard to a constituent member having the same or equivalent function and configuration as that in the encoder 1, a detailed description is omitted and the same reference numerals are used.

Figure 6:
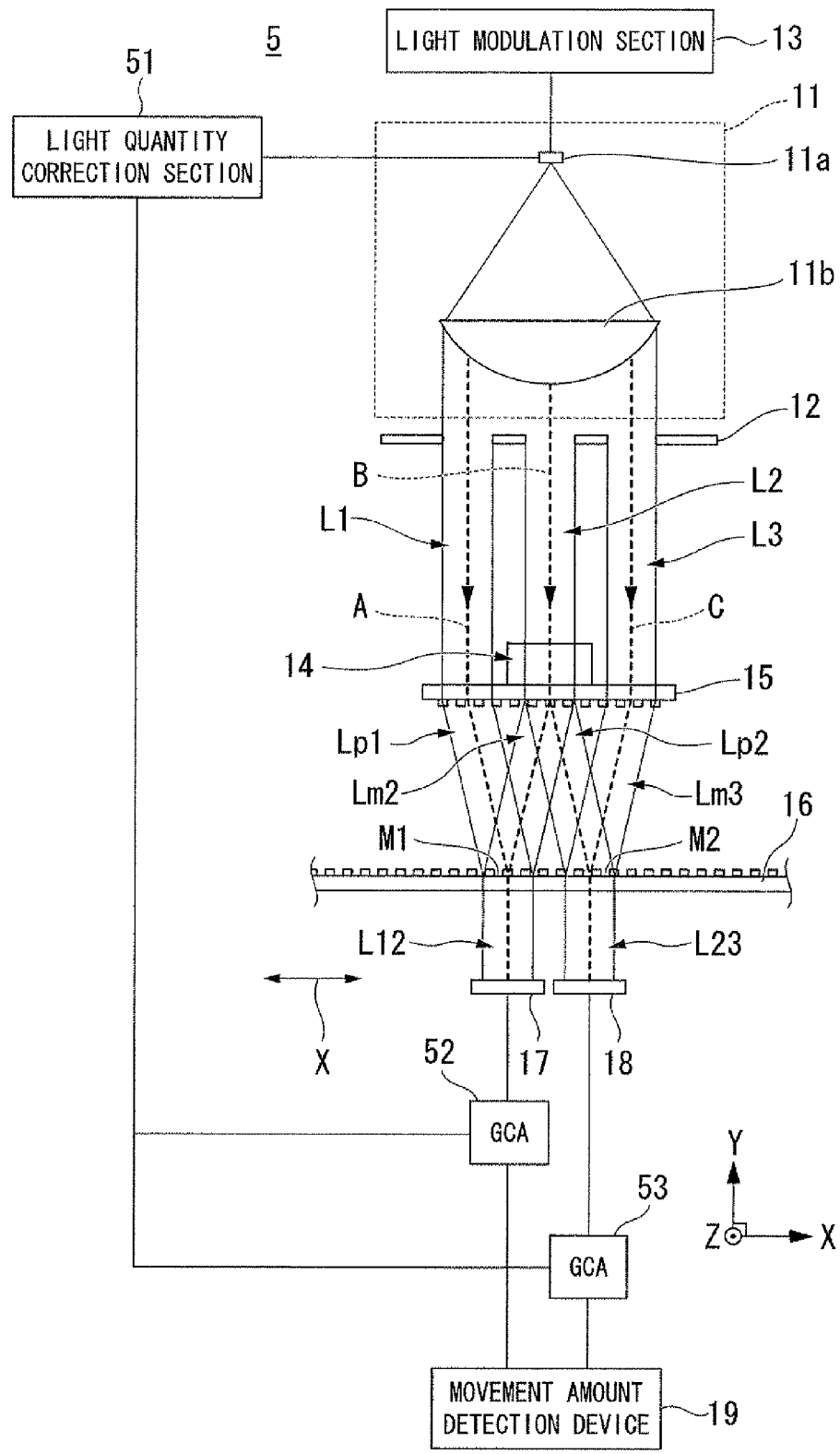
FIG. 6 is a schematic view illustrating a fifth embodiment.

As shown in FIG. 6, the encoder 5 includes the light source section 11, the light branching member 12, the light modulation section 13, the glass block 14, the index grating 15, the two light receiving elements 17 and 18, the movement amount detection device 19, the moving grating 16 which is provided to be able to be displaced relatively with respect to these constituent members, a light quantity correction section 51, and GCAs (Gain Control Amplifiers) 52 and 53. The GCAs 52 and 53 are respectively connected to the light receiving elements 17 and 18.

The light source 11a is provided with a light quantity sensor that detects the light quantity of the emitting light and outputs an electric signal according to the light quantity detected by the light quantity sensor to the light quantity correction section 51. Here, the light quantity of the light that is emitted from the light source 11a changes in accordance with an electric current that is supplied from the light modulation section 13. For example, the interference intensity of the interfering light that is obtained by the light receiving element 17 is expressed in a manner such as in Expression 8 and compared to the modulated light that is obtained from the light source 11a by changing an electric current, an intensity modulation term, (1+F sin ωt), according to a change of the electric current that is supplied from the light modulation section 13 is generated. This intensity modulation term destabilizes the output voltage level of the photoelectric conversion signal that is output from the light receiving element 17. In addition, the same is true of the photoelectric conversion signal that is output from the light receiving element 18.

$$S'1 = |E1 \cdot E2'|^2 = (1+F \sin \omega t)\{2A^2 + 2 \cos(4\pi X/P + (N-1)DA_0 \cdot \sin \omega t)\} \quad \text{(Expression 8)}$$

The light quantity correction section 51 is connected to each of the light source 11a and the GCAs 52 and 53, and controls the levels of the output voltage of the photoelectric conversion signals that are output from the light receiving elements 17 and 18, on the basis of an electric signal output from the light quantity sensor of the light source 11a. That is, the light quantity correction section 51 outputs a control signal in which the intensity modulation term becomes "1" to the GCAs 52 and 53 so as to decrease the influence of the intensity modulation term, (1+F sin ωt), according to a change of the electric current that is supplied from the light modulation section 13.

The GCAs 52 and 53 are respectively connected to the light receiving elements 17 and 18, adjust the levels of the output voltage of the photoelectric conversion signals received from the light receiving elements 17 and 18, on the basis of the control signal from the light quantity correction section 51, and output signals, in which a variation due to a change in light quantity is corrected, to the movement amount detection device 19.

In addition, the encoder 5 related to this embodiment is not limited to the above-described configuration and, for example, not only a configuration in which the light source 11*a* holds the light quantity sensor, but also a configuration is acceptable in which a given light quantity sensor that receives the light which is emitted from the light source section 11 is installed at an arbitrary position and the light quantity correction section 51 controls the GCAs 52 and 53 on the basis of the electric signal according to the light quantity detected by the light quantity sensor which is provided at the arbitrary position. In a case where a change of the electric current that is supplied by the light modulation section 13 and a change in light quantity of the light that is emitted from the light source 11*a* do not completely correspond to each other, it is possible to eliminate the variability caused by the above-mentioned changes by using such a light quantity sensor controlled by the GCAs 52 and 53.

Further, in a case where the variability caused by the above-mentioned changes are not considered, the light quantity sensor is not required and the light quantity correction section 51 may have a configuration in which it receives a signal representing a change of the electric current that is supplied from the light modulation section 13 and controls the GCAs 52 and 53 on the basis of the signal representing a change of the electric current.

Further, by such a configuration, it is possible to avoid a situation where the output voltage levels of the photoelectric conversion signals that are output from the light receiving elements 17 and 18 become unstable.

In addition, the encoder is an encoder having the above-mentioned (1) to (4) as features, since the interference intensities S'1 and S2, in which the modulation elements that are modulated by the light modulation section 13 are eliminated by adding both the interference intensities as shown in Expressions 6 and 7, are respectively obtained in the light receiving elements 17 and 18, as described above. However, all of these requirements may not be met.

For example, wherein an encoder which the interference fringes of the cross regions M1, M2, . . . , and Mk are periodically changed, when the light beam is modulated, due to the shift of the phase of at least any one of the light beam which is among a plurality of light beams formed on the moving grating 16, the interference intensities of k interfering lights, "k" represents a number of the interfering lights, emitted from the plurality of cross regions M1, M2, . . . , and Mk can be expressed in a manner such as shown in Expression 9. In addition, $A_k$ is predetermined at the time of design in accordance with the configuration of the encoder and is a setting value caused by a phase difference between the light beams constituting the interfering light.

$$Sk = 2A^2 + 2\cos(4\pi X/P - A_k \sin \omega t)$$ (Expression 9)

Here, in a case where an error has been generated in the positional information X of the moving grating 16, the respective positional information X of the moving grating 16, that is calculated on the basis of the interference intensity $S_k$ shown in Expression 9, can be expressed in a manner such as shown in Expression 10. In addition, $Y = \alpha \cdot P/4\pi$ represents an amount of error.

$$\begin{bmatrix} X_1 \\ X_2 \\ \vdots \\ X_k \end{bmatrix} = X + \begin{bmatrix} A_1 \\ A_2 \\ \vdots \\ A_k \end{bmatrix} Y$$ (Expression 10)

Accordingly, it is possible to calculate true positional information X by using the information in Expression 10. In addition, it is preferable that an indefinite number k that is the number of interfering lights is two or more, and it is possible to calculate the positional information X having high reliability by using, for example, a minimum-square method.

What is claimed is:
1. An encoder comprising:
a light modulation section that is configured to modulate a wavelength of light emitted from a light source section;
an optical member that is configured to split the light into four light beams;
a moving member that has a diffraction grating at an incidence plane and is configured to move in at least one direction, the incidence plane having a first region and a second region, the first region into which a first light beam having a relatively short optical path length and a third light beam having a relatively long optical path length are entered, the second region into which a second beam having a relatively short optical path length and a fourth beam having a relatively long optical path length are entered, entering axes of the first and third beams into the incidence plane having a symmetrical relationship with respect to a direction, entering axes of the second and fourth beams into the incidence plane having a symmetrical relationship with respect to the direction, entering axes of the first and second beams into the incidence plane having a symmetrical relationship with respect to the direction; and
two light receiving sections that receive a first interfering light and a second interfering light respectively, the first interfering light being formed by an interference of the first and third light beams at the diffraction grating, the second interfering light being formed by an interference of the second and fourth light beams at the diffraction grating,
wherein the split light enters into the moving member such that an interference fringe of the first interfering light and an interference fringe of the second interfering light move in mutually opposite directions on the moving member, based on the modulation by the light modulation section.
2. The encoder according to claim 1, wherein the first interfering light and the second interfering light have mutually opposite phases.
3. The encoder according to claim 1,
wherein the first and third light beams obliquely enter into the first region from opposite sides of each other with respect to a given axis which is perpendicular to the incidence plane, and each of the second and fourth light beams obliquely enter into the second region from opposite sides of each other with respect to a given axis which is perpendicular to the incidence plane.
4. The encoder according to claim 3, wherein an incident direction which the first light beam enters into the incidence plane and an incident direction which the third light beam enters into the incidence plane are symmetrical to a given axis which is perpendicular to the incidence plane, and an incident direction which the second light beam enters into the inci- dence plane and an incident direction which the fourth light beam enters into the incidence plane are symmetrical to a given axis which is perpendicular to the incidence plane.

5. The encoder according to claim 3, wherein an incident angle of the first light beam that enters into the incidence plane and an incident angle of the third light beam that enters into the incidence plane are a same angle, and an incident angle of the second light beam that enters into the incidence plane and an incident angle of the fourth light beam that enters into the incidence plane are a same angle.

6. The encoder according to claim 1, wherein the optical member deflects at least the third light beam and the fourth light beam so as to generate the two interference fringes on the moving member.

7. The encoder according to claim 1, further comprising an optical path length change section that is configured to change an optical path length of the first light beam and the third light beam, and that is configured to change an optical path length of the second light beam and the fourth light beam.

8. The encoder according to claim 1, further comprising a position calculation section which calculates positional information of the moving member based on detection results of the at least two light receiving sections.

9. The encoder according to claim 1, wherein the optical member comprises a collimating member which makes the light that is emitted from the light source section parallel.

10. The encoder according to claim 1, wherein the optical member comprises a first optical member and a second optical member, the first optical member being capable of splitting the light into three kinds of light beams, which are the first light beam, the second light beam and another light beam, and the second optical member being capable of splitting the another light beam into the third light beam and the fourth light beam.

11. The encoder according to claim 10, further comprising an optical path length change section that is disposed on an optical axis of the another light beam and that is configured to change an optical path lengths of the first and third light beams and change an optical path lengths of the second and fourth light beams.

* * * * *